United States Patent [19]

Simi et al.

[11] Patent Number: 4,495,554
[45] Date of Patent: Jan. 22, 1985

[54] ISOLATED POWER SUPPLY FEEDBACK

[75] Inventors: Victor M. Simi, Jessamine County; Jerry M. Sublette, Lexington, both of Ky.

[73] Assignee: International Business Machines Corporation, Armonk, N.Y.

[21] Appl. No.: 479,615

[22] Filed: Mar. 28, 1983

[51] Int. Cl.$^3$ ............................................ H02M 3/335
[52] U.S. Cl. ........................................ 363/21; 363/41; 363/97
[58] Field of Search ............... 363/18, 19, 20, 21, 363/41, 79, 80, 97, 101, 16, 24, 26, 25; 323/222

[56] References Cited

U.S. PATENT DOCUMENTS

| | | | |
|---|---|---|---|
| 3,611,017 | 10/1971 | Freeland | 315/107 |
| 3,818,306 | 6/1974 | Marini | 321/2 |
| 3,924,172 | 12/1975 | Gregorich | 363/21 |
| 4,156,273 | 5/1979 | Sato | 363/56 |
| 4,184,197 | 1/1980 | Cuk et al. | 363/16 |
| 4,322,817 | 3/1982 | Kuster | 363/26 |
| 4,439,821 | 3/1984 | Grippe | 363/97 |

FOREIGN PATENT DOCUMENTS 2919905 11/1980 Fed. Rep. of Germany .

OTHER PUBLICATIONS

IBM *Technical Disclosure Bulletin*, entitled "Overcurrent Detection Circuit for VHF C'uk-Type Power Converter," vol. 25, No. 7B, Dec. 1982, at pp. 3924-3926, by E. A. Dobberstein.

*Primary Examiner*—Peter S. Wong
*Assistant Examiner*—Jeffrey Sterrett
*Attorney, Agent, or Firm*—John A. Brady

[57] ABSTRACT

The switching power supply has pulse width modulation controller 51 isolated by transformer 35, which is connected by line 33 to the output, VO, across lines 27 and 29. An alternating input is obtained from transistor 19 acting as a switch controlled by alternating signals on line 15 connected to node C. Diode 37 in series with resistor 39 provides damping. Response is very fast and effective, and the input elements, including controller 51, are fully isolated.

9 Claims, 2 Drawing Figures

ISOLATED POWER SUPPLY FEEDBACK

DESCRIPTION OF THE INVENTION

1. Technical Field

This invention relates to power supplies of the kind including regulator circuits and converter circuits and, more specifically, relates to the control of the output level of voltage by sensing of the output and returning the sense signal as a control. This invention is directed to such control in which isolation between an input power source and a direct current output is achieved.

2. Background Art

This invention is concerned with control of power supplies and related circuits which may be otherwise state-of-the-art. The preferred embodiment of this invention discloses an isolated feedback circuit employed with a converter generally such as described in U.S. Pat. No. 4,184,197 to S. M. Cuk et al. However, as will be readily apparent in the more detailed description, the invention may be employed with a wide range of power-supply regulator and converter circuits where such circuits have an internal node providing an alternating voltage.

Isolation of a feedback control signal for power supplies and the like is standard. Such isolation provides personal and physical safety at the output side. U.S. Pat. Nos. 4,156,273 to Sato and 3,611,017 to Freeland are broadly illustrative of such isolation. They teach optical isolation and are therefore not closely pertinent to the type of circuit arrangement employed in accordance with this invention.

A power supply of major interest with respect to this invention is the switching-mode power supply. These power supplies typically rely upon the switching characteristics of transistor, the insulated gate field effect transistor (FET) being used for higher frequencies. The ultimate source of power is typically an alternating current voltage which is simply rectified and applied as an input to a converter such as the converter of the above-mentioned U.S. Pat. No. 4,184,197. Isolation of that power source is typically achieved by employing a transformer in the converter prior to the output stage, which provides a direct current output. The FET switch is typically located in the circuit prior to that isolation transformer, and the gate of the FET switch is driven by a control module which must respond to the output level sensed by the converter. Accordingly, to achieve isolation from the power source, either the connection to the sensed voltage or the control module must be isolated.

The control module constitutes an essentially separate circuit requiring direct-current input power. Where the sense input to the control module is directly connected to the output side of the power supply, an independent, isolated power source for the control module is required. The output control signal line would be the remaining location at which isolation of the control module from the power supply input might be provided. The output control signal typically is a square wave at high frequency, which requires significant structure and corresponding expense to isolate. That isolation is additional to the necessary isolation of the power source of the control module. By connecting the control module in the input side and isolating the sense input, power may be by direct connection to the input side of the power supply. The above-mentioned U.S. Pat. Nos. 4,156,273 and 3,611,017 disclose control circuitry in the input side isolated from the output.

DISCLOSURE OF THE INVENTION

In accordance with this invention, a direct-current-isolated control signal for power supplies is achieved by using the output of the power supply and a point of alternating potential within the power supply to operate the primary of a transformer. The voltage at the secondary is rectified for use as a control voltage to the power supply. The transformer thereby isolates the output of the power supply from most of the control circuitry. Although the preferred embodiment is used in a circuit of a somewhat specific type of switched mode power supply, this invention clearly has general utility for control of power supplies.

More specifically, the direct current output of the power supply is connected across the transformer and to a switch in parallel with a diode and resistor in series to provide damping. The secondary side of the transformer drives the rectifier. The output of the rectifier is a level-defining signal to the control circuit for the power supply. Control of the switch is by connection to an alternating signal, which is an existing signal in the power supply.

This arrangement provides for virtually immediate transfer of both undervoltage and overvoltage signals produced by the power supply. Should the alternating signal drop to zero, this would immediately cause undervoltage to be detected. Recovery of the circuit through the damping circuit when the switch is opened is rapid. The transformer provides the desired direct current isolation, permitting the control circuit to be supplied with power from the same power source which supplies the power supply. This is achieved using minimal addition of circuit elements for control. Selection of a few component impedances can adapt the design readily to various requirements of different power supplies.

BRIEF DESCRIPTION OF THE DRAWING

The details of this invention will be described in connection with the accompanying drawing in which.

BEST MODE FOR CARRYING OUT THE INVENTION

Figure 1:
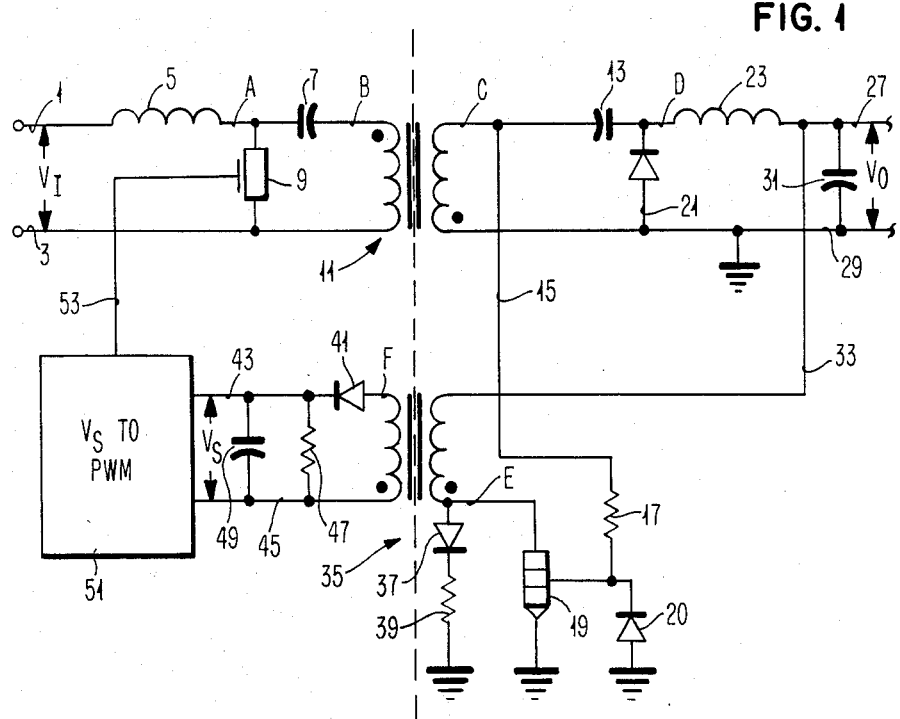
FIG. 1 is a circuit diagram of basic components of a power supply with isolation circuit in accordance with this invention.
Figure 2:
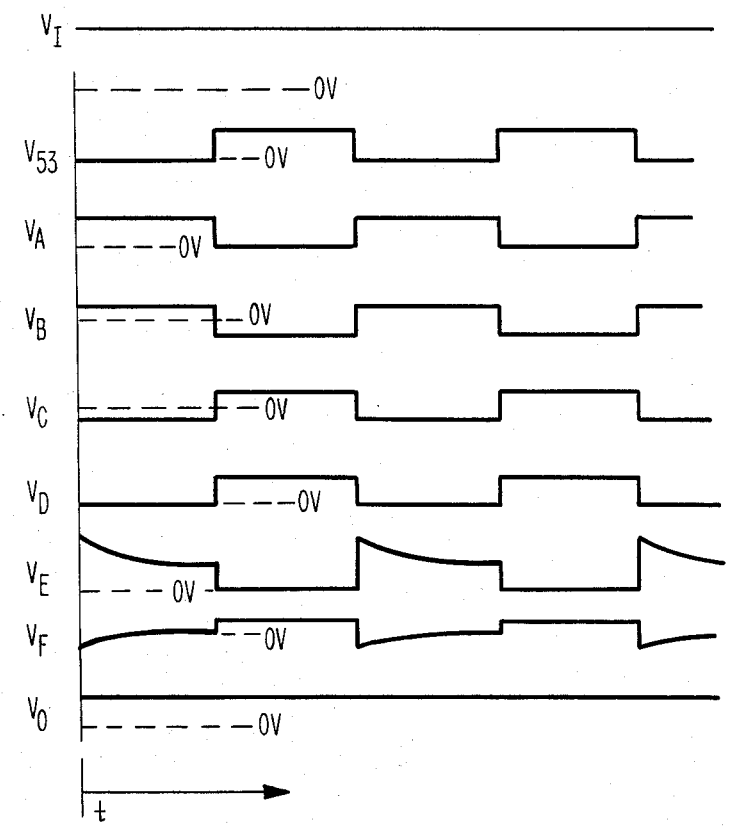
FIG. 2 is a diagram of voltage plotted against time illustrative of voltage at various points in the circuit during illustrative operation cycles of of the circuit.

Referring to FIG. 1, a relatively constant voltage VI (shown as V subscript I in the drawing) is applied across lines 1 and 3 as an input voltage. As shown in FIG. 2, VI is a relatively steady state direct voltage, which typically is a crudely rectified signal from a standard, alternating current power source. This may be entirely standard and conventional. VI typically is not in direct-current isolation from its alternating current source.

Line 1 connects to inductor 5, and the output of inductor 5 connects to one side of capacitor 7 and to a FET switch 9. This circuit point is labeled node A on the drawing. The opposite side of capacitor 7 is connected to the primary of transformer 11, at node B.

The secondary of transformer 11 is connected at node C to one side of capacitor 13. Transformer 11, as shown by the conventional symbolism of dots on the drawing, is wound so that the polarity of a signal to the primary is reversed at the secondary.

Node C is connected through line 15 and resistor 17 to the base or control terminal of a conventional, bipolar transistor 19, the emitter of which is connected to ground reference potential. Diode 20 is connected from the base of transistor 19 to ground is a polarity to bypass voltages turning transistor 19 off, thereby providing protection against high voltages.

The other side of capacitor 13 is connected to one side of a diode 21 and to one side of an inductor 23. The circuit location of these connections is denoted as node D. Diode 21 is connected in polarity to achieve circuit operation as will be subsequently described in detail.

The other side of inductor 23 is connected to line 27, which constitutes the output of the power supply. That output has a voltage VO (shown in the drawing as V subscript O) which appears across line 27 and line 29; line 29 being connected to the remaining side of the secondary of transformer 11, to the remaining side of diode 21, and to one side of capacitor 31. The other side of capacitor 31 is connected to line 27. Line 27 is connected through line 33 to the one terminal of the primary of transformer 35. The other terminal of the primary of transformer 35 is connected to the collector of transistor 19 and to one side of diode 37. The other side of diode 37 is connected through resistor 39 to ground. Diode 37 is connected in polarity to be forward biased by the potential on line 27. The secondary of transformer 35 is connected at node F to diode 41. As shown in the drawing by the conventional dot symbolism, transformer 35 is wound so that the polarity of input voltages to the primary remains the polarity at the secondary.

The other side of diode 41 is connected to line 43. Line 43 has connected in parallel across it to line 45, a resistor 47 and capacitor 49. Line 45 is connected to the remaining terminal of the secondary of transformer 35. This constitutes a standard rectifier circuit producing a direct-current voltage across lines 43 and 45, denoted VS (shown in the drawing as V subscript S). The voltage VS is applied to the controller subcircuit 51 which converts VS to pulse width modulation corresponding to the magnitude of VS. This output is applied on line 53 to the gate of FET 9 to thereby be the basic control of the level of output of circuit of FIG. 1.

Controller 51 may be, and preferrably is, entirely standard circuitry, and it may be purchased as an independent circuit module. Controller 51 simply responds to a direct current input to produce pulse width modulation wherein the given, fixed time period is divided into an up period and a down period of different lengths depending on the level of VS. Such circuits require electrical power input, which typically may be readily generated from the same power source from which VI is generated. Such a source of input power is employed in accordance with this invention since controller 51 is isolated from the output by transformer 35.

Operation of the circuit of FIG. 1 may be best understood by reference to the diagrams of FIG. 2. FIG. 2 shows the voltages at various pertinent locations assuming a duty cycle from controller 51 which is exactly symmetrical, (i.e. half of the time the signal being up and half of the time the signal down during one cycle time). It will be understood that the cycle time does not change as the circuit is controlled, but instead the time in which the gate of transistor 9 is driven on relative to the time it is driven off is that which is controlled. A 100% duty cycle would imply that the gate of transistor 9 was driven on during all of the time and, accordingly, transistor 9 was continuously switched into conductivity. Although the diagrams of FIG. 2 are illustrative of a symmetrical duty cycle, FIG. 2 may be viewed as illustrative of all duty cycles for purposes of the following discussion.

The diagrams assume that transient effects are past and that the circuit is in normal, continuous operation. At the time at which the diagrams starts, V53, which represents the voltage on line 53 to the gate of transistor 9, is at zero. A zero voltage to the gate of transistor 9 switches transistor 9 off. Current had been increasing in inductor 5 from the previous period in which FET 9 was switched on. When FET 9 is switched off, that current generates a voltage sufficient to drive continuing current, which is steered into capacitor 7 and through the primary of transformer 11. By standard transformer action, that current produces a voltage in the secondary of transformer 11, which voltage is reversed in polarity owing to the reverse winding of transformer 11. Accordingly, since VI was positive on line 1, diode 21 is forward biased when switch 9 is gated off. Current powered by the collapsing current in inductor 5 charges capacitor 7 and capacitor 13. Current carried in inductor 23 begins to decline moderately through the low-resistance path through diode 21 and capacitor 31 in parallel with any load being powered by the power supply.

Subsequently in the cycle, controller 51 gates transistor 9 on. That transition is shown in the voltage diagrams of FIG. 2. Node A is brought to ground through transistor 9. VI therefore begins to drive increasing current through inductor 5 through the ground connection of transistor 9. At the same time, the capacitors 7 and 13 discharge through transistor 9 and, since diode 21 is reverse biased, through inductor 23 and capacitor 31 and any load driven by the power supply. Capacitors 7 and 13 were charged sufficiently to cause current in inductor 23 to increase.

At the end of the cycle of control by controller 51, a new cycle is begun by transistor 9 being gated off. As previously described, current in inductor 5 is effective to drive current to charge capacitor 7 and capacitor 13 while declining current in inductor 23 finds a path through diode 21 and capacitor 31. Similarly, at the second half of the second cycle, controller 51 gates transistor 9 back on and this is effective to once again to increase current in inductor 5.

Prior to considering the details of the feedback control through controller 51, the mechanism of driving the converter will be considered with reference to the effects of changes in duty cycle of the pulse width modulation to gate FET 9. When FET 9 is gated on, VI is applied across inductor 5, as node A is connected to ground through the gated-on FET 9. By elementary circuit analysis, current in inductor 5 increases linearly so long as FET 9 is gated on. That is true because, given a constant input potential, current across a inductor generates a reverse potential by the law that counter potential is equal to the inductance multiplied times the change in current with respect to time. The current in an inductor constitutes stored energy in proportion to its amount.

This stored energy is effective to drive current into capacitors 7 and 13 during the other half of the duty cycle, when FET 9 is switched off. During an initial, transient period, this current will be effective to charge capacitors 7 and 13, while not reducing the current through inductor 5 in the same amount that it was increased while FET 9 was switched on. During that transient period, with each duty cycle, the capacitors 7 and 13 would reach a higher degree of charge and, accordingly, would reach a higher back potential against the current flowing in inductor 5. After a limited number of such initial cycles, however, capacitors 7 and 13 will reach a state of potential at which the voltage resisting current flow driven by inductor 5 and assisted by voltage V is effective to substantially cancel the increase in current during the period at which FET 9 was gated on. This condition inevitably occurs because the energy stored in inductor 5 at the time FET 9 is gated off is always effective to further charge capacitors 7 and 13.

As capacitors 7 and 13 become further charged, they present a larger back potential effective to cause a larger decline of current in inductor 5 during the period that switch 9 is gated off and current is therefore being driven into capacitors 7 and 13. During the periods in which switch 9 is gated off, diode 21 is necessarily forward biased. Inductor 23 is not being driven due to the bypass action of diode 21. At the same time, the current in inductor 23 is declining gradually through the circuit including capacitor 31 and diode 21.

Accordingly, if the duty cycle of control signals from control member 51 has a major proportion of time with FET 9 gated on and a minor proportion of the remaining of time with FET 9 gated off, capacitors 7 and 13 become charged to a higher extent; at which degree of charge they provide a back voltage in which the amount of increased current during the portion of a cycle when FET 9 is gated on is counter-balanced by a greater degree of reduction in current during the shorter period of the cycle. (Stated mathematically, the change in current with respect to time will be greater during the period of declining current than during the period of increasing current.) During a subsequent time when FET 9 is gated on, that reduced current again begins to build up by the action of VI through inductor 5 and through FET 9 acting as a direct connection. During this same period of time, the higher charge on capacitors 7 and 13 is effective to produce a potential which drives current, in an amount increased in proportion to the higher charge, into capacitor 31 and through inductor 23, thereby transferring energy to the output of the power supply. Diode 21 is poled to be back-biased and therefore ineffective to carry current during such discharge of capacitors 7 and 13.

In the obverse situation, in which the duty cycle provided by controller 51 has a relatively minor part of the time with FET 9 switched on and a relatively major part of the time with FET 9 switched off, current in inductor 5 at the time of the switching off of FET 9 will be less in an amount corresponding to the decreased amount of time with respect to the just-discussed duty cycle. During the part of the cycle when FET 9 is switched off, the current through inductor 5 will again be effective to charge capacitors 7 and 13 while bypassing capacitor 31 and inductor 23 because of the effective direct connection through diode 21. As the current begins at a lower level, the charging of capacitor 7 and 13 will be correspondingly less. As a greater amount of the cycle is available for capacitors 7 and 13 to resist and therefore decrease the current flow through inductor 5, equilibrium will be reached at a correspondingly lower degree of charge of capacitors 7 and 13. During the period when FET 9 is gated on this lower charge, blocked by the polarity of diode 21, will therefore drive capacitor 31 and inductor 23, but with a lower current corresponding to the lower charge on capacitors 7 and 13.

Mathematically, the potential at node A, VA, when FET 9 is off can be shown to vary with $1-D$, where D is the fraction representing that part of the duty cycle when FET 9 is gated on with respect to all of the duty cycle. Thus, when FET 9 is on, $VI = L$ (inductance of coil 5) multiplied by (x) di (change in current) divided by $D \times T$ (the full time of a duty cycle).

Algebraically rearranging: $L \times di/T = VI \times D$.

When FET 9 is gated off, $VI - VA = L \times (-di)/(1-D) \times T$.

Rearranging algebraically, $L \times di/T = (-1)(VI - VA)(1-D)$.

Substituting $L \times di/T$ from the first equation:

$$VI \times D = (-1)(VI - VA)(1-D).$$

Solving: $VA = VI/1 - D$.

Accordingly, a direct and continuous relationship exists with respect to the duty cycle of FET 9. That relationship permits a control whereby, when the duty cycle moves to a longer period at which FET 9 is gated on, a correspondingly higher output voltage on line 27 occurs. Conversely, when the duty cycle is a shorter period of FET 9 being switched on, the output level at line 27 is correspondingly lower. The action of inductor 23 and capacitor 31 with discharge during part of the cycle through diode 21 and being driven during the remainder of the cycle by the capacitors 7 and 13 will be recognized as providing essentially standard rectifier action, whereby the output, VO, across lines 27 and 29 is substantially a direct current output.

At the 50-50 duty cycle assumed in FIG. 2, the voltage at node A therefore varies from 2VI to zero. The voltages at nodes B and C, being separated from diode 21 by capacitor 13, vary from plus VI to minus VI (capacitors 7 and 13 are of equal value and the turns ratio of transformer 11 is 1 to 1). This analysis and FIG. 2 ignore the increase and decrease in voltage on capacitors 7, 13 and 31 during otherwise steady-state operation. In fact, of course, the voltages change exponentially as the capacitors 7, 13 and 31 are charged and discharged as described. The duty cycle is so rapid, however, with respect to the resulting change in voltage during normal, steady-state operation, that these exponential changes can be ignored.

Node C is connected to the base of transistor 19. Thus, during each period in which controller 51 gates FET 9 on, transistor 19 is driven on. Transistor 19 is overbiased and can conduct any amount of current which might be provided by line 33. During the other periods, transistor 19 is postively driven off. Diode 20 is then forward biased and provides a shunt to ground which protects transistor 19. As transistor 19 is turned on, current flows through the primary of transformer 35, bypassing diode 37 and resistor 39 since transistor 19 constitutes a direct path to the ground reference potential.

This change in current is transferred to node F by the transformer action of transformer 35. FIG. 2 shows the voltages at node F, which typically are in the order of magnitude of plus or minus VO, but need not be of any required magnitude. When FET 9 is switched off, transistor 19 is off and the current in the primary of transformer 35 is collapsing through diode 37 and resistor 39. This provides a negative voltage on node F which is blocked by diode 41. When FET 9 is switched on, diode 37 and resistor 39 are brought to near ground by transistor 19, and current in the primary of transformer 35 is increasing in proportion to VO.

The increasing current is transferred to node F and is rectified to VS, a substantially fixed level, proportional to the size of VO. VS is the sense signal to which controller 51 responds.

The reduction in current when transistor 19 is switched off is very prompt, as the shunt circuit of diode 37 and resistor 39 need only drop to VO. Response to increased VO is immediate with the next period in which transistor 19 is switched on. When there has been no output from transformer 35, for whatever reason, the immediate signal to controller 51 is to adjust for a large sensed undervoltage.

It will be recognized that the isolation aspects disclosed can be used with a wide range of power supplies. Accordingly, patent coverage should not be restricted to the specifics of the embodiments disclosed. Reference is made in particular to the accompanying claims.

We claim:

1. A circuit having a level-control signal with direct current isolation comprising:
   a power supply having a first node carrying an oscillating signal and a second, output node having a rectified signal, said first node and said second node being connected in direct current isolation from the source of power to said power supply,
   a transformer having first and second primary terminals and secondary terminals, said first primary terminal being connected to said output node,
   a rectifier having input terminals and an output, said input terminals being connected to said secondary terminals, said output carrying said level-control signal,
   an electric-signal-controlled switch having a control terminal and a first terminal and a second terminal, said first switch terminal being connected to said second primary terminal, said second switch terminal being connected to a point in said circuit having a reference potential, said switch having control characteristics to be switched on and off within the range of oscillations from said first node of said power supply, said first switch terminal and said second switch terminal being connected when said switch is on and disconnected when said switch is off,
   a unidirectionally conductive damping circuit connected in parallel with said switch, and
   means electrically connecting said control terminal to said first node of said power supply to switch said switch on and off.

2. The circuit as in claim 1 in which said power supply has an internal transformer direct current isolating the output from the source of power to said power supply and said first node is located on the side of said internal transformer direct current isolated by said internal transformer from said source of power.

3. The circuit as in claim 2 in which said power supply comprises a switch and an inductor on the side of said internal transformer direct current isolated from said first node, with means to increase current in said inductor by closing said switch and means to steer current from said inductor to said internal transformer by opening said switch.

4. A switched power supply comprising:
   a source of direct current input voltage to provide power to said power supply,
   an inductor connected to said input voltage,
   a first switch having a conductive state and a non-conductive state and connected, when switched to a first of said states, to connect said inductor for having increased current applied through said inductor by said input voltage and, when switched to a second state of said states, to steer current from said inductor to at least one capacitor,
   a first transformer having its primary connected to be driven by said inductor, said first transformer having its secondary connected to the input of a first rectifier, the output of said first rectifier being the output of said power supply,
   a second transformer having a primary with first and second terminals and having said first terminal connected to said output of said rectifier,
   a second switch having a first terminal and a second terminal and a control terminal for switching said first and second terminals between connected state and a disconnected state, said first terminal being connected to said second primary terminal, said second terminal being connected to a point having a reference potential, said control terminal of said second switch being connected between the secondary of said first transformer and said input of said first rectifier,
   a second rectifier connected to the secondary of said second transformer, and
   control means for said first switch connected to the output of said second rectifier to vary control in response to the level of the output of said second rectifier.

5. The switched power supply as in claim 4 in which said capacitor comprises two separate capacitors, one directly connected in circuit with the primary of said first transformer and one directly connected in circuit with the secondary of said first transformer, and said control terminal of said second switch is connected between the secondary of said first transformer and said capacitor in circuit with the secondary of said first transformer.

6. The switched power supply as in claim 5 also comprising a diode and a resistor in series connected across said second switch and connected to damp current when said second switch is brought to said non-conductive state.

7. The switched power supply as in claim 5 in which said first rectifier comprises a diode connected at the junction of said capacitor in circuit with said secondary and said input of said first rectifier to form a series connection comprising said diode, said secondary and said capacitor in circuit with said secondary, said diode being connected in polarity to be back biased when said first switch is in said first state.

8. The switched power supply as in claim 7 also comprising a diode and a resistor in series connected across said second switch and connected to damp current when said second switch is brought to said non-conductive state.

9. The switched power supply as in claim 4 also comprising a diode and a resistor in series connected across said second switch and connected to damp current when said second switch is brought to said non-conductive state.

* * * * *